United States Patent
Brick et al.

(10) Patent No.: US 9,866,089 B2
(45) Date of Patent: Jan. 9, 2018

(54) MECHANICAL MOTOR SOFT START AND SYSTEMS AND METHODS RELATING THERETO

(71) Applicant: Rotochopper, Inc., St. Martin, MN (US)

(72) Inventors: James Othmar Brick, Paynesville, MN (US); Nicholas Daniel Lieser, Paynesville, MN (US)

(73) Assignee: Rotochopper, Inc., St. Martin, MN (US)

(*) Notice: Subject to any disclaimer, the term of this patent is extended or adjusted under 35 U.S.C. 154(b) by 274 days.

(21) Appl. No.: 14/746,000

(22) Filed: Jun. 22, 2015

(65) Prior Publication Data

US 2015/0372562 A1 Dec. 24, 2015

Related U.S. Application Data

(60) Provisional application No. 62/015,286, filed on Jun. 20, 2014.

(51) Int. Cl.
  *H02K 7/118* (2006.01)
  *B02C 25/00* (2006.01)
  *H02K 7/20* (2006.01)

(52) U.S. Cl.
  CPC .............. *H02K 7/118* (2013.01); *B02C 25/00* (2013.01); *H02K 7/20* (2013.01)

(58) Field of Classification Search
  CPC ........... H02K 7/118; H02K 7/20; B02C 25/00
  See application file for complete search history.

(56) References Cited

U.S. PATENT DOCUMENTS

| | | | |
|---|---|---|---|
| 6,502,333 B1* | 1/2003 | Striegel | B07B 1/005 37/142.5 |
| 7,691,028 B2 | 4/2010 | Hattenbach et al. | |
| 7,922,255 B2 | 4/2011 | Busley et al. | |
| 8,628,034 B2 | 1/2014 | Bouwers et al. | |
| 8,833,324 B2 | 9/2014 | O'Brien et al. | |
| 2003/0063968 A1* | 4/2003 | Zaun | A01C 15/003 414/546 |
| 2013/0200007 A1* | 8/2013 | O'Konek | C02F 1/385 210/749 |
| 2016/0172935 A1* | 6/2016 | Mountain | H02K 7/20 310/68 D |

FOREIGN PATENT DOCUMENTS

DE    4020291 A1 * 1/1992 ............... D01H 1/24

* cited by examiner

*Primary Examiner* — Faye Francis
(74) *Attorney, Agent, or Firm* — Michael A. Collins; Billion & Armitage

(57) ABSTRACT

A system of providing a mechanical soft start of a load driven by an electrical motor is provided. The system includes, in addition to the rotor driven by the electric motor during normal operation, a drive belt coupled to both the electric motor and the rotor for communicating mechanical power from the electric motor to the rotor. The system further includes a secondary motor, and a primary roller coupled to the secondary motor, wherein the roller is selectively engaged with the drive belt during a mechanical soft-start to communicate mechanical power from the secondary motor to the rotor without requiring mechanical power from primary motor.

20 Claims, 4 Drawing Sheets

MECHANICAL MOTOR SOFT START AND SYSTEMS AND METHODS RELATING THERETO

BACKGROUND

Inrush current, switch-on surge, or current spike refers to the current drawn by electric motors when first energized. Current drawn by large, industrial electric motors can be substantial due to the initially stationary rotor. Electric motors can also spontaneously draw large current during operation, due to operating conditions such as a feed jam in an industrial grinder. Electric companies typically levy charges against customers for causing large spikes in current demand, which can be substantial when caused by an industrial electric motor. Soft starts are designed to reduce current spikes, and can offer substantial cost savings for large electric powered equipment operators.

Mechanical systems used to reduce inrush currents can include clutches and couplings which transfer or limit torque to the motor drivetrain. Electrical soft starters limit or reduce motor torque by temporarily reducing the voltage or current input. Electrical soft starters can also temporarily alter the manner in which a motor is connected to an electric network or circuit.

Soft starts, however, have several drawbacks. Typical mechanical systems are integrated in the motor power train, and can render the entire motor inoperable in the event of a malfunction. Repairing these mechanical systems can also require tools and equipment not readily available at a worksite, and equipment worksite conditions can render such repairs time-consuming or impracticable.

Electric motor soft starts are often one of the most expensive individual components of large electric-powered equipment, second only to the large motors. Electric soft starts can be complicated to troubleshoot in the event that they experience problems. Further, because electric soft starts are integrated with the other switchgear in a main electric panel, maintenance can require certified electricians or other specialized repair personal who often are not readily available. Due to the complexity of electric soft starts and device constructions that typically do not use common interchangeable parts widely available through local distributers, maintenance can be expensive and involve extended downtime. In some cases, the cost of soft start troubleshooting and repair, in addition to lost profits during downtime, can exceed any avoided current spike charges, thereby defeating the entire purpose of a soft start. In another embodiment, a variable frequency drive—whose speed may be selectively controller—may be utilized to limit current spikes. However, variable frequency drives add additional cost to the overall system beyond that of a typical motor, and require additional complexity to control and implement.

Therefore, it would be beneficial to develop a system for reducing inrush current spikes without incurring the high cost associated with prior art systems.

SUMMARY

In general, this disclosure describes apparatus, systems, and methods relating to mechanical soft starts for electric motors. In particular, this disclosure describes embodiments relating to soft starts for large industrial electric motors. It should be noted that although the embodiments of this disclosure are described with respect to examples for large industrial electric motors, the embodiments described herein are generally applicable to electric motors of all sizes. Additionally, the embodiments described herein can be applicable to non-electric motors, such as diesel engines, in soft starting, torque-limiting, and other applications.

According to one example of this disclosure, a mechanical soft start comprises a drive element for powering a roller, wherein the roller is capable of engaging a drive belt, and driving the drive belt while engaged.

According to another example of the disclosure, a mechanical soft start system comprises a drivetrain having a rotor, and an electric motor powering the rotor via a drive belt; and a roller capable of engaging the drive belt, driving the rotor belt while engaged, and disengaging from the drive belt.

According to another example of the disclosure, a method for using a mechanical soft start on a belt-driven drive train to reduce initial energizing current draw comprises providing a drivetrain having: a rotor, and an electric motor powering the rotor via a drive belt; engaging a roller with the drive belt; and driving the drive belt via the roller.

The details of one or more examples are set forth in the accompanying drawings and the description below. Other features, objects, and advantages will be apparent from the description and drawings, and from the claims.

DETAILED DESCRIPTION

Figure 1A:
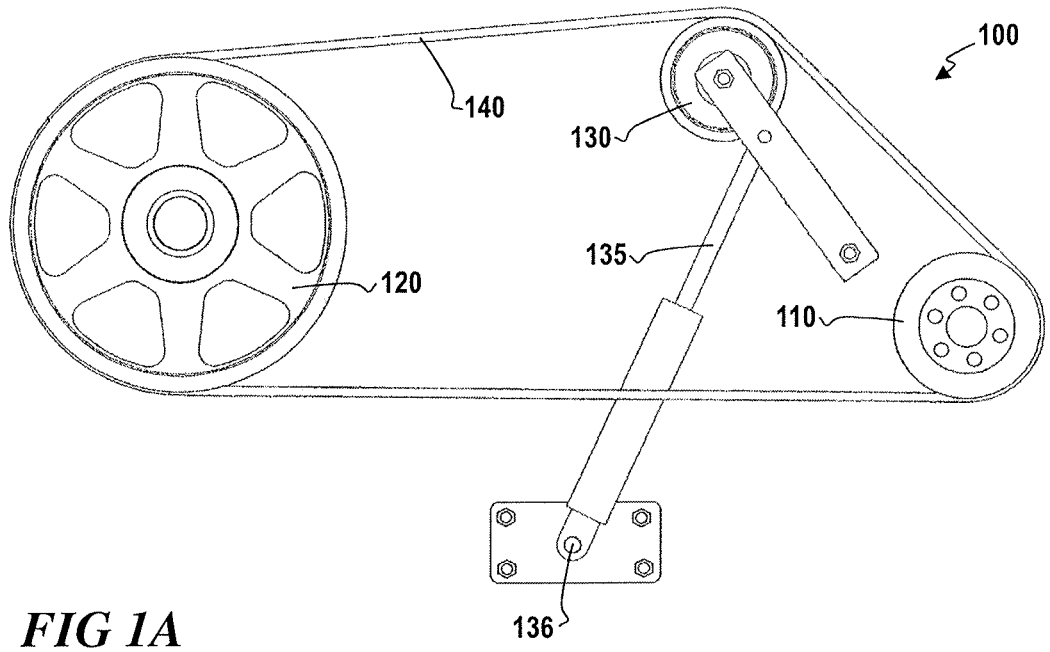
FIGS. 1A-1B illustrate schematic views of mechanical soft starts, according to one or more embodiments of this disclosure.

During operation, an electric motor draws current, the profile of which can be generally classified into an initial energizing phase and a steady state or standard operating phase. The initial energizing phase is characterized by a high current draw, and is often manifested by one or more of a brief inrush transient, and a current draw profile which tapers from a maximum energizing current draw to a steady state current draw level. The steady state or standard operating phase is characterized by a lower, more consistent current draw absent, or even notwithstanding, operating anomalies such as a feed blockage in an industrial grinder. In some cases, the maximum energizing current draw is a local maximum, as operating conditions can cause the electric motor to draw even higher current.

In large industrial equipment, the energizing phase current draw profile can depend on the drive train configuration, and resistance exerted by, for example, a rotor against the electric motor. It is the object of this invention to provide apparatus, systems, and methods by which inrush current transients, maximum energizing current draw, and overall initial energizing phase current draw profiles can be reduced to suitable levels. A suitable current draw level can be determined by factors such as system tolerances to high current draw, utility company fees, and the maximum current capable of being provided by a power source.

In general, the mechanical soft starts provided herein can be practiced with most drivetrains comprising an electric motor. Many embodiments herein will be described in relation to a simplified drivetrain wherein a rotor is driven by an electric motor via a drive belt. Simplified examples and illustrations are provided, in some instances, without well-known structures or operations shown in detail for the purpose of clarity and to avoid obscuring the invention; however, such simplifications are not intended to limit or otherwise reduce the scope of the invention. In other examples, the present invention is described with respect to an industrial grinder such as that provided by Rotochopper, Inc., in which the present invention may be applicable to reduce inrush currents. Further, while the mechanical soft start system of the present invention is described in isolation, it may be utilized in conjunction with—rather than in place of—traditional electric soft start systems. That is, the mechanical soft start system of the present invention may be utilized to augment a traditional electric soft start system.

The present invention is described with reference to the attached figures, wherein like reference numerals are used throughout the figures to designate similar or equivalent elements. The figures are not drawn to scale and they are provided merely to illustrate the invention. Several aspects of the invention are described below with reference to example applications for illustration. It should be understood that numerous specific details, relationships, and methods are set forth to provide an understanding of the invention. One skilled in the relevant art, however, will readily recognize that the invention can be practiced without one or more of the specific details or with other methods. The present invention is not limited by the illustrated ordering of acts or events, as some acts may occur in different orders and/or concurrently with other acts or events. Furthermore, not all illustrated acts or events are required to implement a methodology in accordance with the present invention.

Referring to FIG. 1A, a mechanical soft start system 100 is provided, including a simple drivetrain and a mechanical soft start. The simple drivetrain provided comprises a rotor 120 driven by a motor 110 via a drive belt 140. Motor 110 can be an electric motor, such as an AC electric motor or a DC electric motor. As used herein, "drive belt" can refer to a belt, chain, rope, or other like component used to transfer power from a motor to a moveable component, such as rotor 120. The mechanical soft start provided comprises roller 130, wherein roller 130 engages drive belt 140. Engaging can include touching, distorting, surpassing a given friction threshold, or achieving a physical condition such that the roller 130 can drive the drive belt 140. Mechanical soft-start operations reduce the typical in-rush currents experienced by motor 110 when utilized to start rotor 120. In particular, rather than rely on motor 110 to start rotor 120, roller 130 is engaged with drive belt 140 and a secondary drive element is utilized to provide motive power to roller 130 to start rotor 120. As a result of the power supplied by secondary drive element and roller 130, the inrush current associated with motor 110 is reduced as compared with a start operation that does not employ the mechanical soft start. At some point during the mechanical soft-start (e.g., rotor 120 reaches a threshold speed, set amount of time expires, etc.), motor 110 is started and provides the desired motive force for running rotor 120 at operational speeds. At this point, roller 130 may be disengaged from drive belt 140, and secondary drive element may be turned Off or remain On to power additional elements of the system. In other embodiments, roller 130 may be remain engaged with drive belt 140 and may—rather than provide power—draw power from drive belt 140 to power additional loads (not shown) or supplement the power provided by the secondary drive element.

Figure 1B:
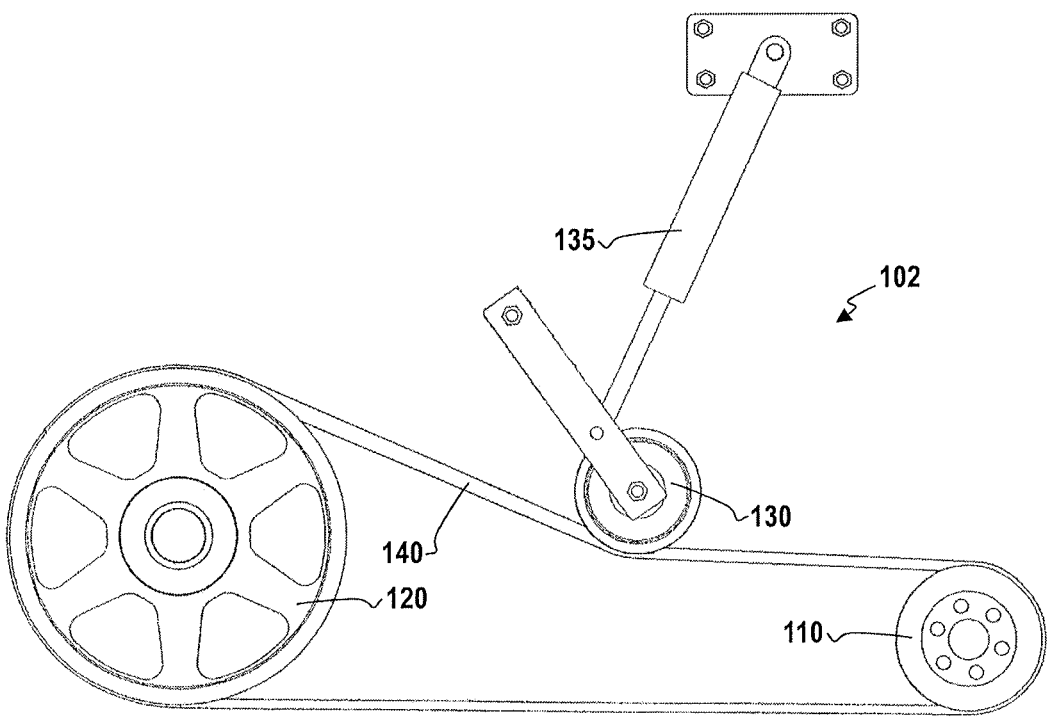

In the view shown in FIGS. 1A and 1B, the drive element for powering roller 130 is not shown. In most embodiments, the roller 130 drive element is independent from the drivetrain motor 110. For example, roller 130 can be powered by a hydraulic motor, an electric motor/generator, pneumatic motor, or other power drive means. In some embodiments, power can be provided to roller 130 from a variety of sources. For example, a typical electric grinder manufactured by Rotochopper, Inc. includes a main motor (represented in some embodiments by element 110 in FIG. 1A) that drives the rotor (represented in some embodiments by element 120 in FIG. 1A) via sheaves and belt (represented in some embodiments by element 140 in FIG. 1A), and smaller motor or multiple motors to drive a hydraulic pump or multiple pumps. Hydraulic pumps can provide power to a number of elements, such as an infeed conveyor, a powerfeed roller, a discharge conveyor, and other components. When the main motor is starting up, any of the hydraulic pumps with sufficient power to drive the mechanical soft start can be used, because the infeed conveyor, powerfeed roller, and other components do not need to run before the rotor is engaged. In this particular embodiment, a small electric motor drives a hydraulic pump, which in turn drives a hydraulic motor that provides the desired mechanical power to roller 130, although it should be understood that in other embodiments the small electric motor or motors may be utilized to directly provide the desired mechanical power to roller 130.

In some embodiments, the drive element powering roller 130 is small relative to motor 110. For example, the main motor for driving a rotor in electric grinders manufactured by Rotochopper, Inc. typically ranges from 150 to 700 horsepower. The electric motors that drive the hydraulic pumps used to power miscellaneous components and mechanical soft starts typically range from 30 to 100 horsepower.

Roller 130 can be maintained in a fixed position engaged with drive belt 140. Roller 130 in other embodiments is capable of engaging and disengaging to and from drive belt 140 via arm 135. FIG. 1B provides a mechanical soft start system 102 having an alternate engaging orientation for roller 130 and drive belt 140. Arm 135 can be a fixed length, and in some embodiments additionally rotatable about a pivot point 136. In other embodiments, arm 135 can be extendable, such as by pneumatic or hydraulic means as shown in FIG. 1A, and can rotate about a point 136 or be fixed. For example, an arm 135 can be fixed at a point 136 such that the fixed arm can extend towards and retract from a drive belt in a perpendicular orientation.

In other embodiments, fixed arm can extend towards and retract from a drive belt in an angled orientation. The orientation of a fixed arm to a drive belt can be determined based on factors such as design constraints and component spacing of a particular machine, frictional coefficients of and between the roller 130 and the drive belt, and physical characteristics of the roller and the drive belt (e.g., cogs, gear teeth, ribs, grooves, and the like). In some embodiments, arm 135 is rotated about pivot point 136 and/or extended in order to achieve suitable drive belt 140 tension or engagement between roller 130 and drive belt 140.

In one embodiment, a sensor is positioned on roller 130 or arm 135 to provide feedback regarding the engagement of roller 130 with drive belt 140. For example, in one embodiment a pressure sensor monitors the amount of force applied by roller 130 and provides the monitored pressure in feedback to a controller (not shown) responsible for actuating arm 135. In this example, the controller may compare the monitored pressure to a threshold value or a desired value and modify the applied pressure accordingly. In this way, over-tensioning of roller 130 can be prevented.

Figure 1C:
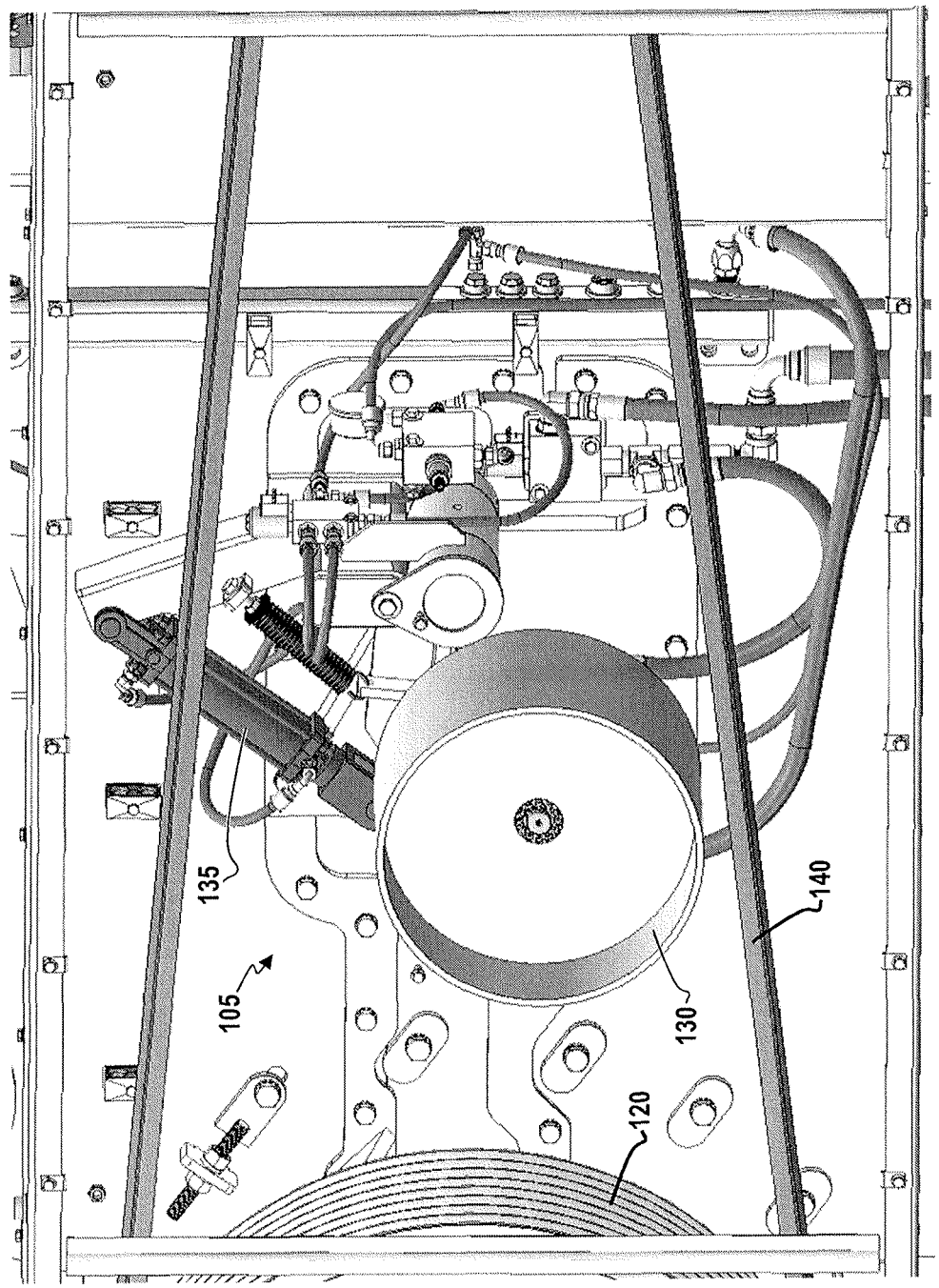
FIG. 1C illustrates a perspective view of a mechanical soft start, according to one or more embodiments of this disclosure.

FIG. 1C provides a perspective view of a soft start system 105 as implemented on an industrial grinder. FIG. 1C highlights the modular aspects and mechanical simplicity of the mechanical soft start concept provided herein, and demonstrates to those skilled in the art how the mechanical soft starts provided herein may readily be incorporated into existing drivetrains as after-market additions. In the view shown in FIG. 1C, roller 130 has not yet been engaged with drive belt 140. To engage roller 130 with drive belt 140, actuator arm 135 is actuated to cause roller 130 to be placed in contact with drive belt 140 (i.e., the portion of drive belt 140 shown on towards the bottom of the industrial grinder. Not shown in this view is the roller drive element (e.g., hydraulic motor, pneumatic motor, or electric motor) used to drive roller 130. In some embodiments, the drive element may be coupled to roller 130 via a shaft connected between the drive element and roller 130. In other embodiments, the drive element is located adjacent to roller 130 and is directly coupled to roller 130.

In the embodiment shown in FIG. 1C, arm 135 is hydraulically actuated to engage roller 130 with drive belt 140. Spring 136 provides a force that opposes the hydraulic force provided by arm 135, which acts to disengage roller 130 when hydraulic force is removed.

With respect to the industrial grinder shown in FIG. 1C, rotor sheave 120 is utilized to drive the grinder mechanism (not shown). To start the grinder, arm 135 is actuated to engage roller 130 with drive belt 140. The drive element (not shown) is then utilized to drive roller 130, which in turn drives drive belt 140 and rotor 120. In response to a threshold being reached (e.g., rotor 120 reaches a threshold speed, or after a threshold length of time for the starting sequence), roller 130 is disengaged from drive belt 140 and motor 110 (not shown in this view) begins providing the required motive force to rotor 120 via drive belt 140. In some embodiments, start-up of motor 110 overlaps with engagement of roller 130 with drive belt 140 for a period of time. In other embodiments, motor 110 starts at approximately the same time that roller 130 is disengaged from drive belt 140. In still other embodiments, roller 130 remains engaged with drive belt 140 even after motor 110 has been engaged and brought up to speed. If roller 130 remains engaged, it can continue to supplement the power provided by motor 110, can remain neutral, or can be used to extract power provided by motor 110 to drive accessories coupled to roller 130 and/or supplement the power provided by the secondary drive element.

Figure 2:
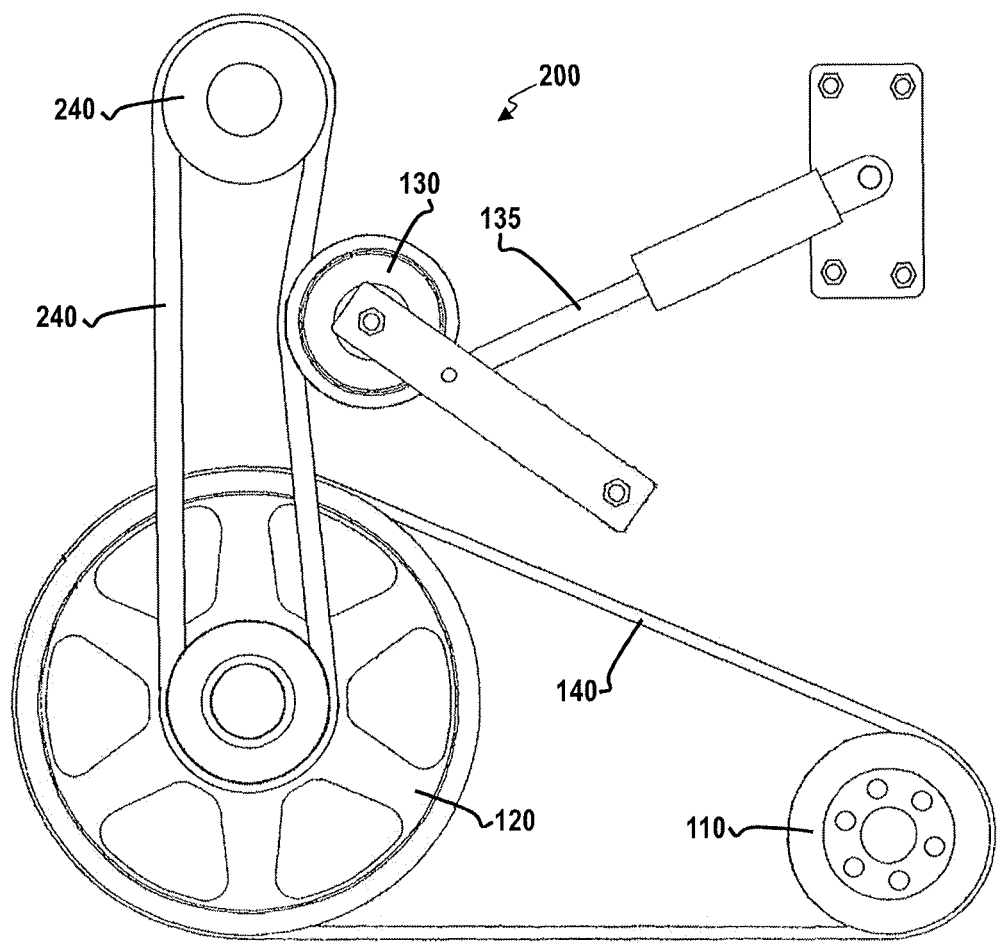
FIG. 2 illustrates a schematic view of a mechanical soft start, according to one or more embodiments of this disclosure.

FIG. 2 provides a mechanical soft start system 200 wherein roller 130 engages soft start drive belt 240, rather than drivetrain drive belt 140. Drive belt 240 communicates with rotor 120 and pulley 260, and is driven by roller 130 when engaged therewith. In one embodiment, a drive element (not shown) is once again coupled to roller 130 to provide motive force to roller 130, and therefore to soft start drive belt 240 when roller 130 is engaged. In another embodiment, rather than couple the drive element to roller 130, pulley 260 is replaced with the drive element such that the drive element is directly coupled to drive belt 240. In this embodiment, roller 130 may still be utilized to engage and tension soft start drive belt 240 to allow the drive element to provide motive force to rotor 120. In each of these embodiments, the drive element may be utilized to provide motive force to rotor 120 during soft start operations, and may be utilized to provide motive force to other components (e.g., infeed conveyor, a powerfeed roller, a discharge conveyor, and other components). A benefit of the embodiment shown in FIG. 2 is that the tension associated with drivetrain drive belt 140 remains constant, as roller 130 is applied to tension soft start drive belt 240. As discussed with other embodiments, after successfully completing the soft start operation (e.g., reaching a threshold RPM of rotor 120), roller 130 can be disengaged. As discussed above, this may include controlling arm 135 to move roller 130 out of contact with soft start drive belt 240, placing the drive element connected to roller 130 into a neutral position, or extracting mechanical energy from rotor 120 via roller 130 to supplement the mechanical power provided by the drive element.

Figure 3E:
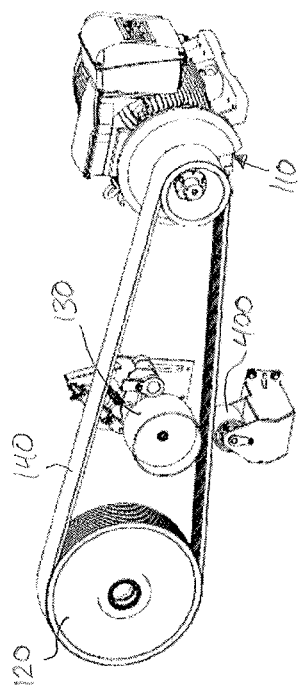
FIGS. 3A-3C illustrate perspective views of mechanical soft start, according to one or more embodiments of this disclosure.
Figure 3C:
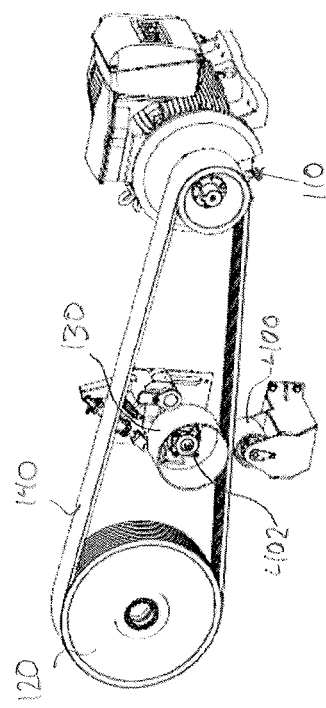
Figure 3A:
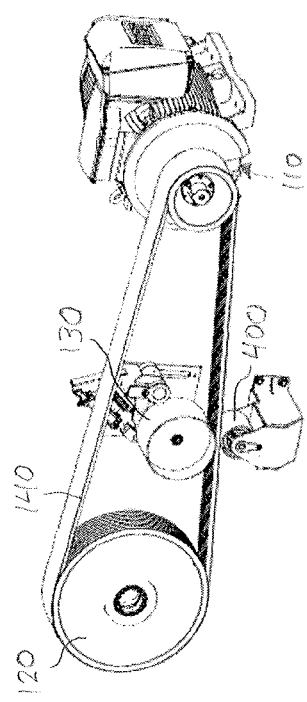

FIGS. 3A-3C illustrate perspective views of mechanical soft start utilizing a hydraulic motor as the drive element, according to one or more embodiments of this disclosure. In particular, the embodiment shown in FIG. 3A illustrates engagement of the hydraulic drive, FIG. 3B illustrates dis-engagement of the hydraulic drive, FIG. 3C illustrates by way of removing a plate associated with the roller to illustrate the location of the hydraulic motor. In each embodiment, soft start system includes (primary) motor 110, rotor 120, roller 130, drive belt 140, secondary roller 400, and hydraulic (secondary) motor 402. Rotor 120 is connected to primary motor 110 via drive belt 140. Roller 130 is located such that it can be selectively engaged with drive belt 140, and secondary roller 400 is located on the opposite side of drive belt 140 across from roller 130, and acts to limit the amount of tension that can be applied to drive belt 140 by roller 130. That is, when the actuator arm is actuated to engage roller 130 with drive belt 140, the position of secondary roller 400 limits the amount of pressure that may be exerted by roller 130 and therefore limits the amount of tension that may be applied to drive belt 140. Because pressure exerted by roller 130 is limited by secondary roller 140, a benefit of this embodiment is that pressure sensors and a feedback controller (or other means of limiting drive belt pressure) may not be required to control engagement of roller 130 with the drive belt 140.

In the embodiment shown in FIG. 3A, roller 130 is engaged with drive belt 140, wherein tension applied to drive belt 140 is constrained by the presence of secondary roller 400. Hydraulic motor (402) shown in FIG. 3C, is engaged to provide mechanical power to roller 130, which is communicated to rotor 120 during the mechanical soft start operation. During the mechanical soft start operation, motor 110 may be maintained in an Off state to prevent large in-rush currents. Based on one or more criteria (e.g., speed/RPM, duration of time, etc.), motor 110 is engaged to provide mechanical power to rotor 120.

As shown in FIG. 3B, when desired (e.g., when a sufficient speed/RPM has been met, duration of time, etc.), roller 130 may be disengaged from drive belt 140. During normal operation (i.e., subsequent to the mechanical soft start), motor 110 provides the necessary motive force to rotor 120. A benefit of the present invention however, is that after supplying the power necessary for the mechanical soft start, hydraulic motor can be utilized to supply power to other loads (not shown). For example, implementation of the mechanical soft start system in an industrial grinder may utilize the hydraulic motor after the mechanical soft start to power additional systems, such as an infeed conveyor, a powerfeed roller, a discharge conveyor, and other components.

It should be noted that in other embodiments, roller 130 may remain engaged with drive belt 140, even following a successful mechanical soft start operation. In this embodiment, the hydraulic motor may remain engaged to supplement the power provided by motor 110, may be modified to a neutral state in which roller 130 turns freely but does not provide mechanical power to drive belt 140, or may be used to extract mechanical power from drive belt 140 to supplement the power provided to secondary loads (not shown).

In the embodiment shown in FIG. 1C, the front plate associated with roller 130 has been removed to illustrate the location of hydraulic motor 402 in relation to roller 130. In this embodiment, hydraulic motor 402 is located adjacent to roller 130. In other embodiments, hydraulic motor 402 may be coupled to roller 130 via a shaft, such that hydraulic motor is not required to be adjacent to roller 130.

Embodiments provided herein also relate to methods for using mechanical soft starts. Method embodiments will be described with respect to FIG. 1, but it is understood that method embodiments are applicable to all mechanical soft start embodiments provided herein.

In some embodiments roller 130 is powered before it engages the drive belt 140. In other embodiments, roller 130 is not operating before it engages drive belt 140. In some embodiments, motor 110 can engage while roller 130 drive element is still engaged. In this embodiment, roller 130 drive element will disengage a length of time after which the rotor motor has been engaged. In other embodiments, roller 130 drive element will disengage just as or a length of time before motor 110 energizes.

In various embodiments, disengaging can include the roller 130 breaking physical contact with the belt, transitioning a roller to a neutral, non-powered, or minimal resistance state, or combinations thereof. A roller 130 can be transitioned to a neutral, non-powered, or minimal resistance state via a clutch or hydraulic valve (not shown), while remaining in contact with the drive belt 140. A clutch or hydraulic valve can be an alternative to a pivot arm where space is limited.

According to some embodiments of this disclosure, roller 130 can disengage from drive belt 140 per a time threshold, as measured by a timer set in an appurtenant control system. The time threshold can be adjusted, for example, to match the weights of different rotor styles, or based on one or more of a maximum energizing current draw or energizing current draw profile of the machine drive train. A given length of time can be determined through field testing.

According to other embodiments of this disclosure, a roller 130 can disengage from the drive belt based on the rotations per minute (RPMs) of a system component. In some embodiments, a sensor in communication with a controller is mounted near the rotor sheave or other drive component such that the controller (not shown) is able to determine when a rotor reaches desired RPMs.

According to other embodiments of this disclosure, a roller 130 can disengage from the drive belt 140 based on a blockage or obstruction. For example, a grinder may experience a material jam in the grinding chamber. In some embodiments a sensor or sensors can be used to detect a blockage and disengage the roller 130.

In the event that operating conditions or other influences obstructs the rotor 120 from achieving a desired RPM during soft starting, (e.g., wood debris remaining in the grinding chamber from previous operation and jamming the rotor 120), a control system (not shown) can disengage roller 130. Further embodiments can disable motor 110 and additionally or alternatively activate an alarm. This can prevent an amperage spike in the electric motor 110 due to increased resistance of the rotor 120. Such a method can prevent damage to the drive belt 140 and avoid straining drive elements and motor 110. In some embodiments this protective feature can be regulated by a timer and/or sensor; if rotor 120 fails to reach desired RPMs within a length of time, the controller would alert the operator and discontinue the starting sequence. Desired RPMs and time lengths can be calibrated based on machine type, rotor size, motor size, and other factors.

According to some embodiments of this disclosure, a roller can remain engaged to the drive belt while the drive belt is being driven by the drive motor in order to create hydraulic pressure. Hydraulic pressure can be stored and/or used by other components. Such an embodiment can provide enhanced functionality and also prevent wasted horsepower from a roller remaining engaged to a drive belt.

Methods for operating mechanical soft start and calibrating operating parameters therefore can be determined based on current draw of a motor during energizing. For example, a soft start may reduce the maximum energizing current draw to a percentage of the non-soft started maximum, or to a percentage of the operating current draw (e.g., 120% of the operating current draw.)

Further embodiments relate to engines, such as gasoline or diesel engines. In particular, soft start embodiments as described herein can be used to start or assist the rotation of a rotor driven by an engine such that wear and stress on a clutch is reduced. Diesel engines are popular on industrial equipment such as grinders. An increase in horsepower from one industrial equipment model to another often correlates to a noticeable increase in rotor size and weight. A simple drive train of an engine can include a rotor driven by an engine and a clutch for engaging and disengaging the rotor such that power can be transferred and withheld from the rotor by the engine. The clutch can transfer power to the rotor via a drive belt. A soft start engaging a rotor as described herein can reduce the stress on a clutch or other power transfer system by spinning up the rotor before the clutch engages.

Other embodiments include mechanical soft start systems that are on the same axis of rotation as the electric motor 110 or rotor 120. Such soft start systems can be linearly actuated and coupled with the motor or rotor shaft, in a fashion similar to a car starter. For example, rather than utilize a roller 130 selectively engaged with the drive belt 140, a drive element such as hydraulic motor 402 shown in FIG. 3C may be coupled directly or via a shaft located on the same axis of rotation as rotor 120 to provide mechanical power to rotor 120 during a mechanical soft-start operation.

As described above, disengagement of roller 130 may be based on or more factors, either alone or in combination with one another. For example, in one embodiment, disengagement of roller 130 is based on a timer that is calibrated for mechanical soft-start of a particular system. In this example, the timer is initiated at the start of the mechanical soft start operation (e.g., when roller 130 is engaged with drive belt 140), and at the expiration of the timer or reaching of a threshold, the roller 130 is disengaged from drive belt 140. The duration of the timer may depend on the size of the rotor 120 being started, the size of the drive element being used to drive roller 130, or a combination thereof. In another example, RPM thresholds are calibrated and utilized to determine when to disengage roller 130. Different RPM thresholds may be utilized depending on the rotor 120 being started and the drive element being used to drive roller 130. In other embodiments, various other means of controlling/ monitoring the engagement/disengagement of roller 130 may be utilized and calibrated based on the components being utilized. While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

What is claimed is:

1. A system comprising:
   a primary motor;
   a rotor;
   a drive belt coupled to both the motor and the rotor, wherein the drive belt communicates mechanical power from the motor to the rotor;
   a secondary motor, wherein the second motor generates less horsepower than the primary motor; and
   a primary roller coupled to the secondary motor, wherein the roller is selectively engaged with the drive belt during a mechanical soft-start to communicate mechanical power from the secondary motor to the rotor without requiring mechanical power from primary motor, and wherein the primary motor is utilized to provide mechanical power to the rotor during normal operation following the mechanical soft start.

2. The system of claim 1, further including an arm coupled to the primary roller that is selectively actuated to engage the roller with the drive belt.

3. The system of claim 2, wherein the arm is actuated about a pivot point to engage the primary roller with the drive belt.

4. The system of claim 2, wherein the arm is extendable to engage the primary roller with the drive belt.

5. The system of claim 1, further including a secondary roller located opposite the primary roller, on an opposite side of the drive belt, to limit the tension applied to the drive belt by the primary roller.

6. The system of claim 1, wherein the primary roller is selectively engaged with an interior surface of the drive belt.

7. The system of claim 1, wherein the secondary roller is selectively engaged with an exterior surface of the drive belt.

8. The system of claim 1, wherein the primary motor is an electrical motor and the secondary motor is a hydraulic motor or a pneumatic motor.

9. The system of claim 1, wherein the secondary motor is utilized to drive one or more external loads following the mechanical soft-start of the rotor.

10. The system of claim 1, wherein the roller remains engaged with the drive belt during the mechanical soft start until a desired rotation per minute (RPM) value is exceeded.

11. The system of claim 1, wherein the roller remains engaged with the drive belt during the mechanical soft start until a duration of time has been exceeded.

12. The system of claim 1, wherein the roller is disengaged from the drive belt following mechanical soft start of the rotor, wherein disengaging the roller from the drive belt includes breaking physical contact with the drive belt, transitioning the roller to a neutral, non-powered, or minimal resistance state, or combinations thereof.

13. The system of claim 1, wherein the rotor is coupled to an industrial grinder mechanism, and wherein the secondary motor is coupled to provide power to one or more of an infeed conveyor, a powerfeed roller, and/or a discharge conveyor after the mechanical soft start.

14. An industrial grinder comprising:
    a grinding element having a rotor;
    an electrical motor;
    a drive belt that couples the electrical motor to the rotor of the grinding element;
    a hydraulic motor; and
    a primary roller coupled to the hydraulic motor, wherein the roller is selectively engaged with the drive belt during a mechanical soft-start to communicate mechanical power from the hydraulic motor to the rotor of the grinding element without requiring mechanical power from the electrical motor.

15. The industrial grinder of claim 14, further including an arm coupled to the primary roller that is selectively actuated to engage the primary roller with the drive belt during mechanical soft start operations.

16. The industrial grinder of claim 14, further including a secondary roller located opposite the primary roller, on an opposite side of the drive belt, to limit the tension applied to the drive belt by the primary roller.

17. The industrial grinder of claim 14, wherein the roller remains engaged with the drive belt during the mechanical soft start until a desired rotation per minute (RPM) value is exceeded.

18. The industrial grinder of claim 14, wherein the roller remains engaged with the drive belt during the mechanical soft start until a duration of time has been exceeded.

19. An industrial grinder comprising:
    a grinding element having a rotor;
    a primary drive belt;
    an electrical motor coupled to the rotor of the grinding element by the primary drive belt;
    a hydraulic motor;
    a secondary drive belt; and
    a primary roller coupled to the hydraulic motor, wherein the roller is selectively engaged with the secondary drive belt during a mechanical soft-start to communicate mechanical power from the hydraulic motor to the rotor of the grinding element without requiring mechanical power from the electrical motor.

20. The industrial grinder of claim 19, further including an arm coupled to the primary roller that is selectively actuated to engage the primary roller with the drive belt during mechanical soft start operations.

* * * * *